(12) United States Patent
Uemura et al.

(10) Patent No.: US 11,119,495 B2
(45) Date of Patent: Sep. 14, 2021

(54) WORK AREA DETERMINATION SYSTEM FOR AUTONOMOUS TRAVELING WORK MACHINE, AUTONOMOUS TRAVELING WORK MACHINE AND WORK AREA DETERMINATION PROGRAM

(71) Applicant: Kubota Corporation, Osaka (JP)

(72) Inventors: Katsuhiko Uemura, Sakai (JP); Nobuyuki Yoshii, Sakai (JP); Takeshi Komorida, Sakai (JP); Kensuke Uemoto, Sakai (JP); Kentaro Shinkai, Sakai (JP)

(73) Assignee: Kubota Corporation, Osaka (JP)

( * ) Notice: Subject to any disclaimer, the term of this patent is extended or adjusted under 35 U.S.C. 154(b) by 149 days.

(21) Appl. No.: 16/188,371

(22) Filed: Nov. 13, 2018

(65) Prior Publication Data

US 2019/0196483 A1 Jun. 27, 2019

(30) Foreign Application Priority Data

Dec. 27, 2017 (JP) .............................. JP2017-252061

(51) Int. Cl.
   *G05D 1/02* (2020.01)
   *A01D 34/00* (2006.01)
   *A01D 34/71* (2006.01)
   *A01D 34/66* (2006.01)
   (Continued)

(52) U.S. Cl.
   CPC ......... *G05D 1/0219* (2013.01); *A01D 34/008* (2013.01); *A01D 34/66* (2013.01); *A01D 34/71* (2013.01); *G05D 1/0044* (2013.01); *G05D 1/0278* (2013.01); *A01D 2101/00* (2013.01);
   (Continued)

(58) Field of Classification Search
   CPC .. G05D 1/0219; G05D 1/0044; G05D 1/0278; G05D 2201/0208; G05D 1/0088; G05D 1/0225; A01D 34/008; A01D 34/71; A01D 34/66; A01D 2101/00
   See application file for complete search history.

(56) References Cited

U.S. PATENT DOCUMENTS 6,101,794 A * 8/2000 Christopherson ...... A01D 75/30
                                                     280/124.179
2003/0144774 A1   7/2003 Trissel et al.
   (Continued)

FOREIGN PATENT DOCUMENTS

EP       2926642 A1    10/2015
JP    2013164742 A      8/2013
   (Continued)

*Primary Examiner* — Michael V Kerrigan
(74) *Attorney, Agent, or Firm* — The Webb Law Firm

(57) ABSTRACT

A work area determination system for an autonomous traveling work machine which is controlled autonomously based on self machine position information indicative of a self machine position, the work area determination system including an operation terminal capable of determining a work area. The operation terminal includes a positioning device for acquiring terminal position information indicative of a position of the operation terminal, a work area determination section that determines the work area based on the terminal position information, and a work area information outputting section for outputting work area information which is information relating to the determined work area.

9 Claims, 4 Drawing Sheets

(51) Int. Cl.
  *G05D 1/00* (2006.01)
  *A01D 101/00* (2006.01)
(52) U.S. Cl.
  CPC ......... *G05D 1/0088* (2013.01); *G05D 1/0225* (2013.01); *G05D 2201/0208* (2013.01)

(56) References Cited

U.S. PATENT DOCUMENTS

2013/0268165 A1\* 10/2013 Hashima ................ A01D 34/80
                                                       701/50
2017/0020064 A1    1/2017 Doughty et al.
2019/0227561 A1\*  7/2019 Hiramatsu ............. G05D 1/027
2019/0369620 A1\* 12/2019 Zhou .................... G05D 1/0212

FOREIGN PATENT DOCUMENTS

| JP | 201610382 A   | 1/2016  |
| JP | 2017167995 A  | 9/2017  |
| WO | 2017159801 A1 | 9/2017  |
| WO | 2017204052 A1 | 11/2017 |

\* cited by examiner

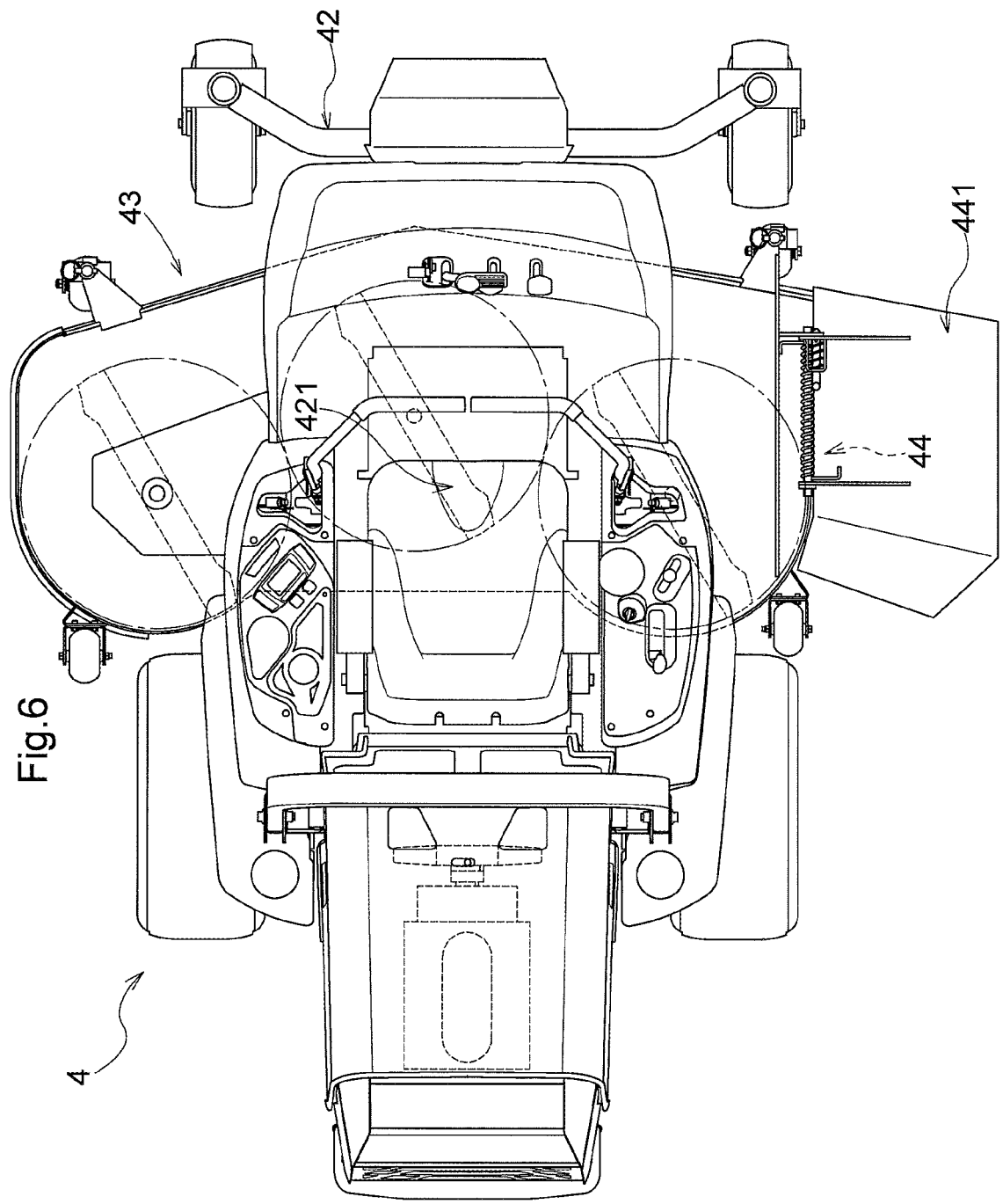

WORK AREA DETERMINATION SYSTEM FOR AUTONOMOUS TRAVELING WORK MACHINE, AUTONOMOUS TRAVELING WORK MACHINE AND WORK AREA DETERMINATION PROGRAM

CROSS-REFERENCE TO RELATED APPLICATION

This application claims priority to Japanese Patent Application No. 2017-252061 filed Dec. 27, 2017, the disclosure of which is hereby incorporated in its entirety by reference.

TECHNICAL FIELD

This disclosure relates to a work area determination system for an autonomous traveling work machine, the autonomous traveling work machine and a work area determination program.

BACKGROUND DISCUSSION

In recent years, there has been a growing popularity of an autonomous traveling work machine that automatically effects maintenance of a field such as a garden, a park, etc. For such autonomous traveling work machine to effect the work autonomously, it is necessary for this autonomous traveling work machine to be able to recognize an area where the work is to be effected.

As a method for causing an autonomous traveling work machine to recognize a work area, e.g. Japanese Unexamined Patent Application Publication No. 2013-164742 (Patent Document 1) proposes a method according to which a work area is defined by installing in advance an area wire in an outer edge of the area in the field where the work is to be effected. With this method, when the autonomous traveling work machine detects, by means of a magnetic sensor mounted thereon, a magnetic field generated by the wire to which power is being supplied, the machine recognizes that it has reached an end of the area where it has to effect the work and the makes a turn. With this, it is possible to cause the autonomous traveling work machine to effect the work with limiting the work to the inside of the area where the wire is installed in advance.

As another method, e.g. Japanese Unexamined Patent Application Publication No. 2016-10382 (Patent Document 2) proposes a method which installs a boundary informing means such as a fence, wireless communication, light, etc. With these methods, it is possible to cause the autonomous traveling work machine to recognize an area where the work is to be effected.

BACKGROUND ART DOCUMENTS

Patent Documents

Patent Document 1: Japanese Unexamined Patent Application Publication No. 2013-164742

Patent Document 2: Japanese Unexamined Patent Application Publication No. 2016-10382

SUMMARY

Problem to be Solved by Invention

Incidentally, according to such techniques as disclosed in Patent Documents 1, 2, it was needed to install in advance boundary informing means such as area wire, a fence, a wireless communication, a light, etc. The methods requiring pre-installment of such boundary informing means would present trouble of its installment. Further, a work is possible only in a field where the boundary informing means is installed in advance. These were the problems. Moreover, for introduction of an autonomous traveling work machine, installment of the boundary informing means is needed, so there is the possibility of inviting high introduction costs.

In view of the above, there is a need for realization of a work area determination system for an autonomous traveling work machine, the autonomous traveling work machine and a work area determination program, that reduce the burden of pre-installment of such boundary informing means.

Solution

A work area determination system relating to one embodiment of the present invention is a work area determination system for an autonomous traveling work machine which is controlled autonomously based on self machine position information indicative of a self machine position, the work area determination system comprises an operation terminal capable of determining a work area;

wherein the operation terminal includes a positioning device for acquiring terminal position information indicative of a position of the operation terminal, a work area determination section that determines the work area based on the terminal position information, and a work area information outputting section for outputting work area information which is information relating to the determined work area.

An autonomous traveling work machine relating to one preferred embodiment of the present invention comprises:

a traveling machine body;

a first positioning device for acquiring self machine position information indicative of a self machine position;

a work area information acquisition section for acquiring work area information indicative of a work area; and a traveling control section for controlling traveling of the traveling machine body based the self machine position information and the work area information, so that the traveling machine body may travel within the work area;

wherein the work area information acquisition section acquires the work area information from an operation terminal that is capable of determining the work area and that also includes a second positioning device for acquiring terminal position information indicative of a position of the operation terminal, a work area determination section that determines the work area based on the terminal position information, and a work area information outputting section for outputting work area information which is information relating to the determined work area.

Also, a work area determination program relating to one preferred embodiment of the present invention is a work area determination program for an autonomous traveling work machine which is autonomously controlled based on self machine position information indicative of a self machine position, the work area determination program comprises computer-executed functions of:

a positioning function for acquiring terminal position information inactive of a position of an operation terminal which stores this work area determination program therein;

a work area determination function for determining a work area based on the terminal position information; and a work area information outputting function for outputting work area information which is information on the determined work area.

With these configurations, a work area where a work is be effected by an autonomous traveling work machine can be determined without pre-installment of any boundary informing means. So, it is possible to reduce the trouble and cost required for introduction of the autonomous traveling work machine.

Next, preferred embodiments of the present invention will be explained. It is understood, however, that the present invention is not to be limited in any way by the preferred embodiments to be described next.

According to one preferred embodiment of the work area determination system relating to the invention, the operation terminal further includes a terminal position information recording section for recording the terminal position information and a recording control section for controlling execution and stopping of recording of the terminal position information; and the work area determination section determines the work area based on history of the terminal position information recorded in the terminal position information recording section.

With the above-described arrangement, the work area can be determined based on the terminal position information of the operation terminal. So, it is easy to cause an actual state of the field to be reflected in the determination of the work area.

According to one preferred embodiment of the work area determination system relating to the present invention, the operation terminal further includes a displaying section for displaying a map of area including the work area, the work area determined by the work area determination section being displayed in a manner superimposed with the map in the displaying section; and a work area correction section is provided for correcting the work area based on a user's operation on the work area displayed in the displaying section.

With the above-described arrangement, since the work area can be corrected based on the map displayed in the displaying section, intuitive operation is made possible. Further, the work area can be corrected with the actual state of the work area being reflected therein.

According to one preferred embodiment of the work area determination system relating to the present invention, the operation terminal is detachably attachable to the autonomous traveling work machine.

With the above-described arrangement, the constitutional components mounted on the operation terminal such as the positioning device can be used not only at time of determination of the work area, but also at time of driving of the autonomous traveling work machine. So, omission of some components is made possible.

According to one preferred embodiment of the work area determination system relating to the present invention, when the operation terminal is attached, the operation terminal transmits the terminal position information as the self machine position information to the autonomous traveling work machine.

With the above-described arrangement, the self machine position information of the autonomous traveling work machine can be acquired with using the positioning device included in the operation terminal.

According to one preferred embodiment of the work area determination system relating to the present invention, the operation terminal sets the work area in association with a movement of a user holding the operation terminal set under a state in which recording of the terminal position information is to be executed by the positioning device in an outer edge of a range where a work is to be effected in field.

With the above-described arrangement, the work area can be determined by the intuitive and simple method involving only the user's movement in the outer edge of the work area with the user holding the operation terminal.

According to one preferred embodiment of the work area determination system relating to the present invention, the autonomous traveling work machine is a grass mower.

With the above-described arrangement, a work area of an autonomous traveling grass mower can be determined easily, and maintenance of grass (lawn) in a garden, a park, a sports field, etc. can be automatized.

According to one preferred embodiment of the work area determination system relating to the present invention, the autonomous traveling work machine includes a cut grass discharging outlet and controls discharging cut grass clippings in such a manner that cut grass clippings are discharged when the cut grass discharging outlet is oriented toward the work area.

With the above-described arrangement, in a grass cutting work by the autonomous traveling work machine, cut grass clippings can be discharged only to a permissible area.

Further and other features and advantages of the present invention will become apparent upon reading the following detailed description of some illustrative and non-limiting embodiments with reference to the accompanying drawings.

BRIEF DESCRIPTION OF THE DRAWINGS

FIG. 6 is a top view showing the further embodiment (riding grass mower) of the present invention.

EMBODIMENTS

First Embodiment

Figure 1:
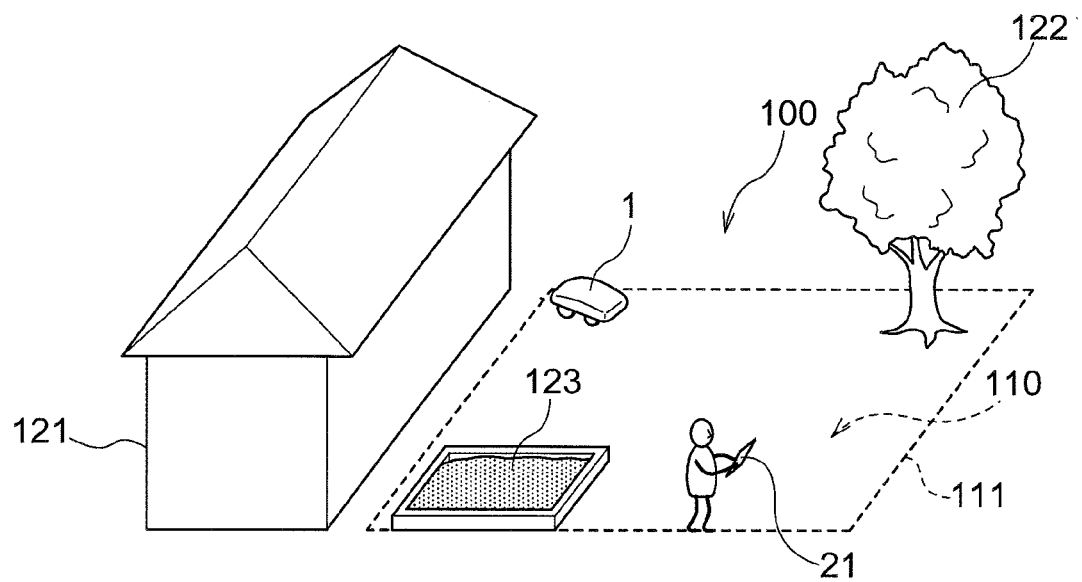
FIG. 1 is a schematic showing a first embodiment of a work area determination system according to the present invention.
Figure 2:
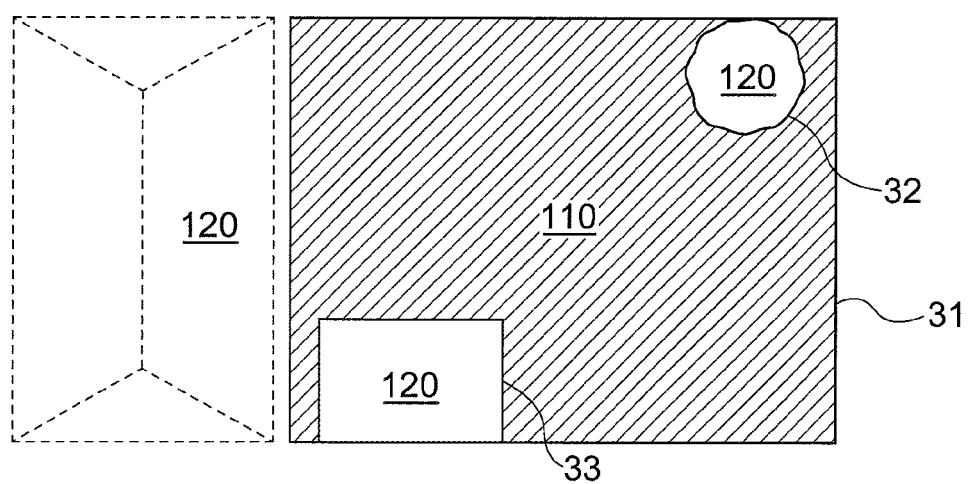
FIG. 2 is a schematic of work area setting in the first embodiment of the work area determination system according to the present invention.
Figure 3:
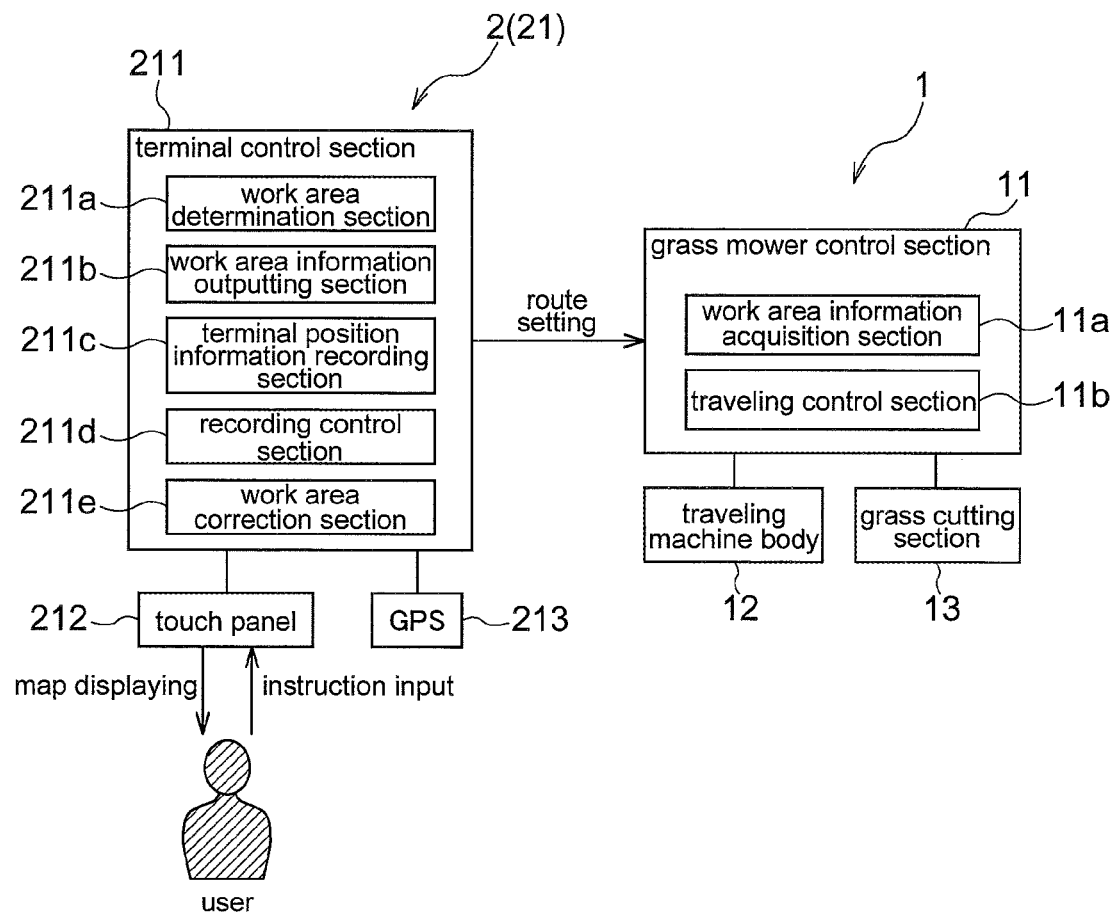
FIG. 3 is a view showing relations among constituent components in the first embodiment of the work area determination system according to the present invention.

With reference to FIGS. 1 through 3, there will be explained a first embodiment of a work area determination system for an autonomous traveling work machine and the autonomous traveling work machine both relating to the present invention. In the instant embodiment, there will be explained an example in which the work area determination system for an autonomous traveling work machine relating to the invention is applied to a work area determination system 2 for an autonomous traveling grass mower 1 as an example of the autonomous traveling work machine. In the following discussion, a global positioning system will be referred to as "GPS system".

In the instant embodiment, for a field 100, a work area 110 in which the autonomous traveling work machine 1 is to effect a grass cutting work is to be determined. The autonomous traveling grass mower 1 includes a grass mower control section 11, a traveling machine body 12 and a grass cutting section 13 and includes also an operation terminal 21 detachably attached thereto. The grass mower control section 11 includes a work area information acquisition section 11a and a traveling control section lib. The autonomous traveling grass mower 1 is capable of wireless communication with the operation terminal 21, so that the above devices can be remotely controlled via the operation terminal 21.

The operation terminal 21 constitutes the work area determination system 2 and includes a terminal control section 211, a touch panel 212 operable as a "displaying section", and a GPS 213 as a "positioning device". The terminal control section 211 includes a work area determination section 211a, a work area information outputting section 211b, a terminal position information recording section 211c, a recording control section 211d and a work area correction section 211e. The GPS 213 functions as a positioning device for acquiring terminal acquired information indicative of a position of the operation terminal 21 and functions also as a positioning device for acquiring self machine position information indicative of a self machine position of the autonomous traveling grass mower 1 when the operation terminal 21 is attached to the autonomous traveling grass mower 1. The touch panel 212 functions as a displaying section and functions also as an inputting means for a user.

The field 100 includes, as "excluded areas" 120, a house 121, a tree 122, and a flower bed 123, which need to be excluded from the work area 110. In the instant embodiment, there will be explained an example in which the operation terminal 21 is employed as an example of the work area determination system 2 for setting the work area 110 in such field 100 and controlling the autonomous traveling grass mower 1.

In order to set the work area 110, firstly, a user will operate the touch panel 212 to instruct start of a work area input to the operation terminal 21. In response to this start instruction, the recording control section 211d causes the terminal position information recording section 211c to start acquisition of the terminal position information by the GPS 213, so that the terminal position information recording section 211c will record such terminal position information sequentially. Then, the user, as holding the operation terminal 21 set to the state for the sequential recording of the terminal position information, will move with using desired moving means such as a UV, etc. or on foot along a boundary 111 on the inner/outer side of the work area 111. After encircling movement once all around the boundary 111, the user will operate the touch panel 212 to instruct end of the work area input operation to the recording control section 211d, whereby the recording control section 211d will cause the terminal position information recording section 211c to end the inputting of the work area.

Upon completion of the work area input, the touch panel 212 will show thereon a prerecorded map which illustrates a schematic of the field 100. Next, based on the terminal position information sequentially recorded in the course of one around encircling traveling by the user along the boundary 111, the terminal control section 211 causes drawing of a first closed curve 31 on the map of the field 100. With this, the work area determination section 211a will automatically recognize the inside of this first closed curve drawn based on the boundary 111 as the work area 110. Simultaneously, the work area determination section 211a will recognize the outside of this first closed curve 31 as the excluded area 120.

Next, following a similar procedure as above, the user will walk around the outer circumferences of the tree 122 and the flower bed 123 respectively to cause the operation terminal 21 to record the terminal position information. After completion of this recording, closed curves drawn based on the terminal position information sequentially recorded in the course of round encircling traveling around the tree 122 and the flower bed 123 will be drawn on the map of the field 100. Specifically, on the inner side of the first closed curve 31, a second closed curve 32 representing the tree 122 and a third closed curve 33 representing the flower bed 123 will be drawn, upon which the work area determination section 211a will automatically incorporate the insides of the second closed curve 32 and the third closed curve 33 to the excluded area 120. Incidentally, the position, the shape and the size of the respective closed curve can be changed by operating the touch panel 212. This operation method can be finger tracing of the closed curve displayed on the touch panel 212, for instance. In accordance with such operations on the touch panel 212, the work area correction section 122e will correct the contour or the position of the work area 110 obtained by the work area determination section 211a.

After completion of the setting of the work area 110, the work area determination section 211a automatically determines a traveling route of the autonomous traveling grass mower 1 and the work area information outputting section 211b transmits this work area and the traveling route to the work area information acquisition section 11a of the autonomous traveling grass mower 1. Thereafter, the user will instruct, by using the operation terminal 21, starting of a grass cutting work to the autonomous traveling grass mower 1 and also will attach the operation terminal 21 to the autonomous traveling grass mower 1. Then, the traveling control section lib will cause the traveling machine body 12 to travel to guide the autonomous traveling grass mower 1 on the traveling route, based on the self machine position information acquired with use of the GPS 213. While traveling on the traveling route, the autonomous traveling grass mower 1 will effect a grass cutting work with controlling the grass cutting section 13. After completion of the grass cutting work in the entire work field 110, the autonomous traveling grass mower 1 will return to a charging device and stop operation and start power charging.

As described above, with the work area determination system of this embodiment for the autonomous traveling grass mower 1, in determination of a work area 110 for the autonomous traveling grass mower 1, the burden of preinstalling a boundary informing means can be reduced.

Second Embodiment

Figure 4:
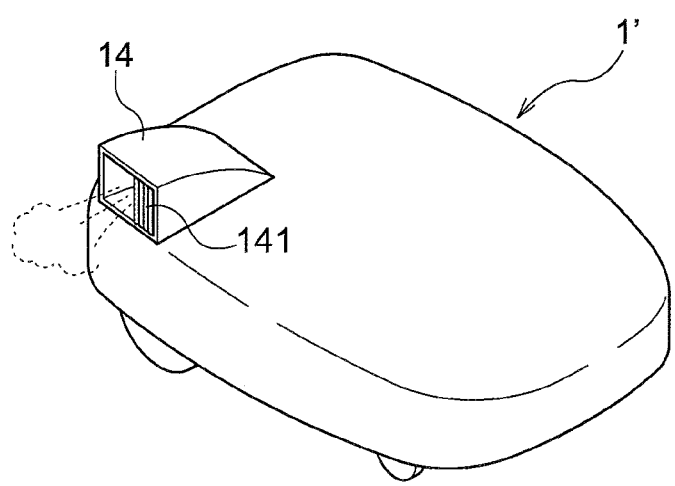
FIG. 4 is a view showing one example of an autonomous traveling work machine in a second embodiment of the work area determination system according to the present invention.

Next, a second embodiment of a work area determination system for an autonomous traveling work machine and the autonomous traveling work machine relating to the present invention will be explained with reference to FIG. 4. An autonomous traveling grass mower 1' as an example of the "autonomous traveling work machine" relating to the present invention includes a cut grass discharging outlet 14. This cut grass discharging outlet 14 is opened to the right side relative to the forward traveling direction of the autonomous traveling grass mower 1', so that cut grass clippings produced from a work can be discharged to the right side relative to the forward traveling direction of the autonomous traveling grass mower 1'. The cut grass discharging outlet 14 can be opened/closed with a shutter 141. Incidentally, those respects not indicated explicitly in the following discussion are identical to the first embodiment and will be denoted with same or similar signs and detailed explanation thereof will be omitted.

In this embodiment, on the map of the field 100 (see FIG. 1) displayed on the touch panel 212 (in the following discussion, refer always to FIG. 3), a cut grass discharging area (not shown) can be set. The method of this setting of the cut grass discharging area can be made based on recording of the terminal position information by walking, similarly to the setting method of the exclusion area 120 (see FIG. 2) or can be made based on displaying on the touch panel 212.

Upon settings of the work area 110 (see FIG. 1) and the cut grass discharging area, the work area determination section 211*a* (see FIG. 2) will automatically set a traveling route of the autonomous traveling grass mower 1'. In this, the traveling route will be set such that cut grass clippings discharged from the cut grass discharging outlet 14 may be discharged toward the cut grass discharging area. Specifically, as cut grass clippings will be discharged to the right side relative to the forward traveling direction of the autonomous traveling grass mower 1', the traveling route will be set such that the right lateral face of the autonomous traveling grass mower 1' will face the cut grass discharging area. With this, the orientation of the cut grass discharging outlet 14 will be judged based on the self machine position information and the forward traveling direction of the autonomous traveling grass mower 1' and discharge of cut grass clippings can be controlled in such a manner that cut grass clipping will be discharged only when the cut grass discharging outlet 14 is oriented toward the cut grass discharging area. Incidentally, such grass discharging area can be the work area 110 (see FIG. 1). Further, when the cut grass discharging outlet 14 faces a position where cut grass clippings should not be discharged, e.g. the house 121 (see FIG. 1), the flower bed 123 (see FIG.), etc., the autonomous traveling grass mower 1' will be controlled so as to temporarily stop discharging of cut grass clippings by shutting the shutter 141.

In the instant embodiment, since the autonomous traveling grass mower 1' is equipped with the cut grass discharging outlet 14, it is possible to carry out a discharging type grass cutting work in which a grass cutting work is carried out with discharging cut grass clippings produced thereby being discharged simultaneously. Further, the setting for effecting discharging of cut grass clippings associated with the discharging type grass cutting work toward an appropriate position can be made easily. In the discharging type work, cut grass clippings are discharged immediately. So, this discharging type work is advantageous in the respect of possibility of reduction of power loss, over the mulching type work in which cut grass clippings will be left as they are.

Other Embodiments

Lastly, other embodiments of the work area determination system for an autonomous traveling work machine and the autonomous traveling work machine relating to the present invention will be explained. Incidentally, arrangements to be disclosed in the following respective embodiments can be used in combination with the arrangements disclosed in other embodiments unless contradiction results from such combining.

In the foregoing embodiment, there was explained as an example the arrangement in which the operation terminal 21 (see always FIG. 1 in the following discussion) is adapted to be detachably attachable to the autonomous traveling grass mower 1. However, the invention is not limited to such arrangement; instead, the operation terminal 21 can be provided as a device separate from the autonomous traveling grass mower 1, for instance.

In the foregoing embodiment, there was explained as an example the arrangement in which the autonomous traveling grass mower 1 acquires self machine position information with using the GPS 213 (see FIG. 3) of the operation terminal 21 attached thereto. However, the invention is not limited to such arrangement; instead, the autonomous traveling work machine can include a positioning device which is provided separately of the operation terminal.

In the foregoing embodiment, there was explained as an example the arrangement in which all of the constituent components of the work area determination system 2 are included in the operation terminal 21. However, some of the constituent components may be provided in the autonomous traveling grass mower 1 or any other device. For instance, the operation terminal 21 may include at least the touch panel 212, the GPS 213, the terminal position information recording section 211*c* and the recording control section 211*d* and transmit acquired terminal position information to the autonomous traveling grass mower or to any other device, so that the settings and correction of the work area 110 etc. may be effected in the autonomous traveling grass mower or to any other device.

Figure 5:
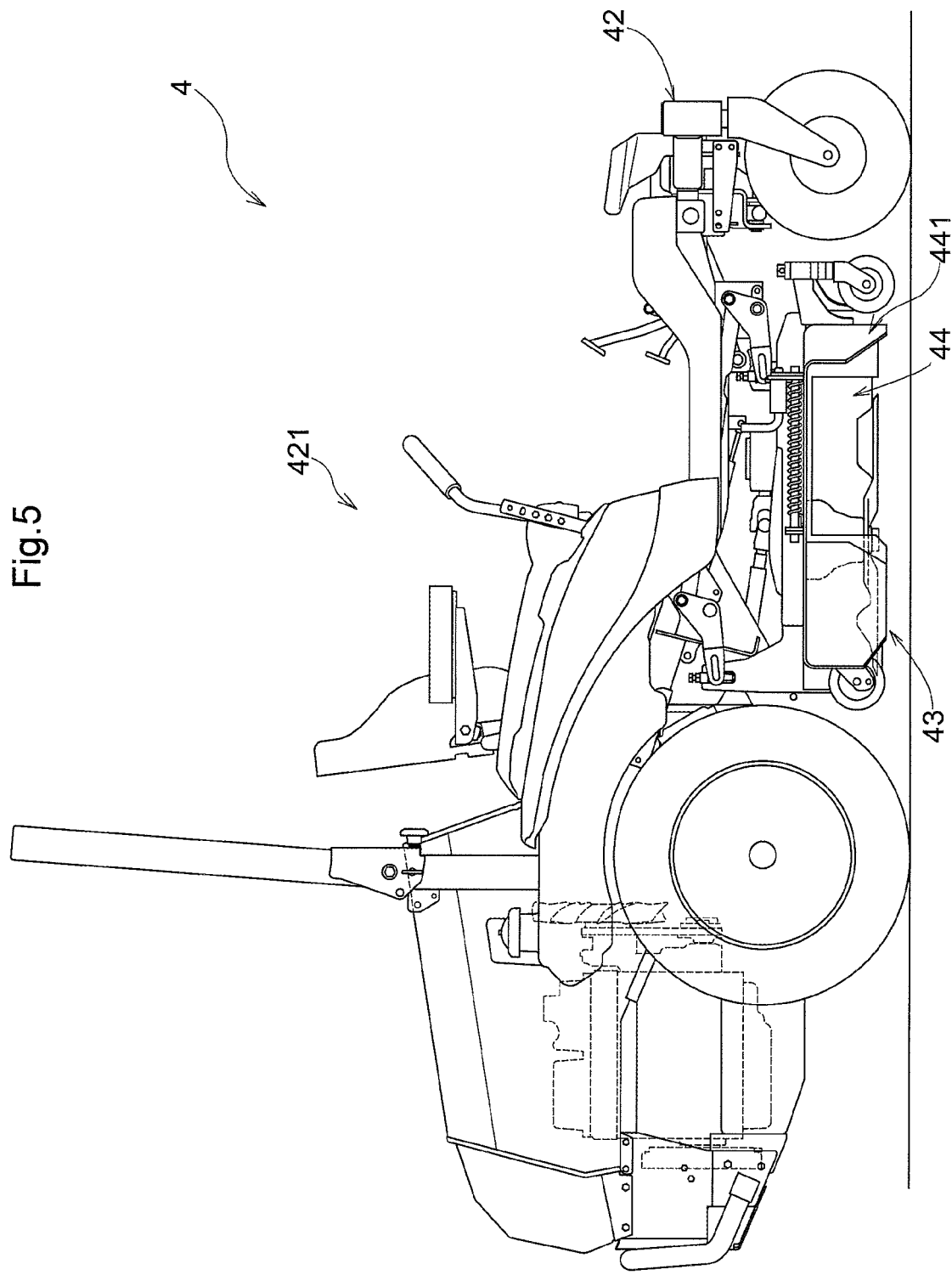
FIG. 5 is a side view showing a further embodiment (riding grass mower) of the present invention.

Further, the autonomous traveling work machine for which the work area is to be determined by the inventive work area determination system can be a vehicle on which a worker can ride. As an example of such autonomous traveling work machine, a riding type grass mower 4 is shown in FIGS. 5 and 6. This riding type grass mower 4 includes a traveling machine body 42, a grass cutting section 43 and a cut grass discharging outlet 44. The traveling machine body 42 includes a cockpit 421 in which a worker can ride and carry out maneuvering by manual operations. Further, the cockpit 421 can accommodate the work area determination system 2 (see always FIG. 3 in the following discussion) and the riding type grass mower 4 can be autonomously controlled by the work area determination system 2 as well. The cut grass discharging outlet 44 includes a shutter 441 capable of opening/closing this outlet by pivoting about an axis provided substantially parallel with the forward traveling direction of the traveling machine body 42. Opening/closing of the shutter 441 can be controlled by the work area determination system 2 or by a manual operation, whereby discharging of cut grass clippings and stopping of discharging can be switched over.

In the foregoing embodiment, there was explained as an example the arrangement in which the work area 110 (see FIG. 1) is set based on the terminal position information sequentially recorded by the operation terminal 21. However, the invention is not limited to such arrangement; instead, terminal position information are recorded at vertices of a work area and a polygon that connects the vertices to each other is set as the work area.

Further, there was shown an example in which in the above-described work area determination system 2 and the autonomous traveling work machine including the work area determination system 2, the work area determination system 2 is constituted of hardware. However, at least a portion of the work area determination system 2 may be constituted of a program executable by a computer.

In the respects of the other arrangements too, the embodiments disclosed in the detailed discussion are illustrative in all respects and the scope of the present invention is not limited thereby. One skilled in the art would readily understand that they can be appropriately modified within a scope not departing from the essence of the invention. It is understood therefore that further embodiments modified within a range not departing from the essence of the present invention too would be intended to be encompassed within the scope of the present invention as a matter of course.

INDUSTRIAL APPLICABILITY

The present invention can be used as a work area determination system for an autonomous traveling work grass mower, for instance.

REFERENCE SIGN LIST

1: autonomous traveling grass mower
11: grass mower control section
11a: work area information acquisition section
11b: traveling control section
12: traveling machine body
13: grass cutting section
14: cut grass discharging outlet
141: shutter
2: work area determination system
21: operation terminal
211: terminal control section
211a: work area determination section
211b: work area information outputting section
211c: terminal position information recording section
211d: recording control section
211e: work area correction section
212: touch panel
213: GPS
4: riding type grass mower
42: traveling machine body
421: cockpit
43: grass cutting section
44: cut grass discharging outlet
441: shutter
100: field
110: work area
111: boundary
120: excluded area
121: house
122: tree
123: flower bed
31-33: closed curves

The invention claimed is:

1. A work area determination system for an autonomous traveling work machine which is controlled autonomously based on self machine position information indicative of a self machine position, the work area determination system comprising an operation terminal capable of determining a work area;
wherein the operation terminal includes a positioning device for acquiring terminal position information indicative of a position of the operation terminal, a terminal position information recording section for sequentially recording the terminal position information, a work area determination section that determines the work area at an inside of a closed curve drawn based on the terminal position information sequentially recorded, a work area information outputting section for outputting work area information which is information relating to the determined work area, a displaying section for displaying a map of an area including the work area, the work area determined by the work area determination section being displayed in a manner superimposed with the map in the displaying section, and a work area correction section for correcting at least one of a position, a shape, and a size of the work area based on a user's operation of touching the closed curve itself representing the work area displayed in the displaying section.

2. The work area determination system of claim 1, wherein:
the operation terminal further includes a recording control section for controlling execution and stopping of recording of the terminal position information.

3. The work area determination system of claim 1, wherein the operation terminal is detachably attachable to the autonomous traveling work machine.

4. The work area determination system of claim 3, wherein when the operation terminal is attached, the operation terminal transmits the terminal position information as the self machine position information to the autonomous traveling work machine.

5. The work area determination system of claim 1, wherein the operation terminal sets the work area in association with a movement of a user holding the operation terminal set under a state in which recording of the terminal position information is to be executed by the positioning device in an outer edge of a range where a work is to be effected in field.

6. The work area determination system of claim 1, wherein the autonomous traveling work machine is a grass mower.

7. The work area determination system of claim 6, wherein
the autonomous traveling work machine includes a cut grass discharging outlet for discharging cut grass clippings to a lateral side relative to a traveling direction of the autonomous traveling work machine and controls discharging the cut grass clippings in such a manner that the cut grass clippings are discharged when the cut grass discharging outlet is oriented toward a preset grass discharging area.

8. An autonomous traveling work machine comprising:
a traveling machine body;
a first positioning device for acquiring self machine position information indicative of a self machine position;
a terminal position information recording section for sequentially recording the terminal position information;
a work area information acquisition section for acquiring work area information indicative of a work area; and
a traveling control section for controlling traveling of the traveling machine body based on the self machine position information and the work area information, so that the traveling machine body may travel within the work area;
wherein the work area information acquisition section acquires the work area information from an operation terminal that is capable of determining the work area and that also includes a second positioning device for acquiring terminal position information indicative of a position of the operation terminal, a work area determination section that determines the work area which is at an inside of a closed curve drawn based on the terminal position information sequentially recorded, a work area information outputting section for outputting the work area information which is information relating to the determined work area, a displaying section for displaying a map of an area including the work area, the work area determined by the work area determination section being displayed in a manner superimposed with the map in the displaying section, and a work area correction section for correcting at least one of a position, a shape, and a size of the work area based on a user's operation of touching the closed curve itself representing the work area displayed in the displaying section.

9. A work area determination program for an autonomous traveling work machine which is autonomously controlled based on self machine position information indicative of a self machine position, the work area determination program comprising computer executed functions, which when executed by a computer, cause the computer to perform:
- a positioning function for acquiring terminal position information inactive of a position of an operation terminal which stores this work area determination program therein;
- a terminal position information recording function for sequentially recording the terminal position information;
- a work area determination function for determining a work area which is at an inside of a closed curve drawn based on the terminal position information sequentially recorded;
- a work area information outputting function for outputting work area information which is information on the determined work area;
- a display function for displaying the work area determined with use of the work area determination function in a manner superimposed with a map of an area including the work area; and
- a work area correction function for correcting at least one of a position, a shape, and a size of the work area based on a user's operation of touching the closed curve itself representing the work area displayed.

* * * * *